UNITED STATES PATENT OFFICE.

WILLIAM H. KRUG, OF WASHINGTON, DISTRICT OF COLUMBIA, ASSIGNOR TO THE MARSDEN COMPANY, OF PHILADELPHIA, PENNSYLVANIA.

SUBSTITUTE FOR HORN AND PROCESS OF MANUFACTURING SAME.

SPECIFICATION forming part of Letters Patent No. 648,415, dated May 1, 1900.

Application filed February 7, 1900. Serial No. 4,373. (No specimens.)

*To all whom it may concern:*

Be it known that I, WILLIAM H. KRUG, a citizen of the United States, residing at Washington, in the District of Columbia, have invented a certain new and useful Improved Substitute for Horn and Process of Manufacturing the Same, of which the following is a specification.

My invention has for its object to secure a hard horn-like substance adapted for many purposes; and to this end it consists in a treatment of cellular tissue, as pith, and in the product of said treatment, as fully described hereinafter.

In carrying out my invention I take the stalks of maize or other pithy plant and remove the pithy portion in order to get a non-fibrous cellular tissue, which is the basis of my new manufacture. This pith is comminuted to any desired extent and is then boiled for a sufficient time—say one-half hour—and at atmospheric pressure in a solution of alkali, preferably caustic soda, in five times its weight of water, sufficient solution being used to cover the mass of pith treated. The material is then suitably filtered and washed, either filter-cloths or a centrifugal strainer being used, until the wash-water is colorless. The washed material may now be bleached—as, for instance, by the use of calcium hypochlorite solution or otherwise. If hypochlorite solution is used, it is prepared by adding one part of the bleaching-powder to thirty parts of water and filtering, a small quantity of hydrochloric acid being added to facilitate the liberation of chlorin and hasten the bleaching action. After bleaching the material is returned to the filter-cloths and washed thoroughly. The material is then ground to detach the gelatinized pith substance or non-fibrous cellular tissue from the non-gelatinized fibers always present, and the different component parts of the said materials are then separated by pouring the resulting magma on fine sieves and washing by means of a water-spray, which washes off the gelatinized material, and the discharged liquid, which contains the gelatinized pith substances or non-fibrous cellular tissue in a finely-divided state, is run into settling-tanks and allowed to settle for a day. The supernatant water is drawn off, and the remaining material is transferred to receptacles—as, for instance, wire-gauze—which will allow the liquid to drain off until the mass is firm enough to be removed as a cake and dried, or it may be compressed into a cake to exclude air-bubbles and render it uniform in character. Preferably the drying temperature should not exceed 50° centigrade. After running into settling-tanks the material may be boiled before allowing it to settle to thoroughly remove the air which, if it remained, would render the material porous. The substance thus secured after drying the material is extremely hard, tenacious, horn-like in character, and with a specific gravity of about 1.4 and can be turned or worked in different ways and will take a high polish.

The color and density may be varied by introducing at appropriate stages any desired pigments of mineral of organic origin and by the addition of substances such as chalk, barium sulfate, &c.

I claim as my invention—

1. The within-described article of manufacture consisting of a hard mass composed of gelatinized vegetable tissue, freed from non-gelatinized fibers, substantially as set forth.

2. The within-described process of producing a horn-like substance consisting in subjecting a vegetable tissue, as pith, to the action of alkali solution, washing and grinding, and then removing the non-gelatinized fibers by washing, and then draining the resultant mass and drying, substantially as described.

In testimony whereof I have signed my name to this specification in the presence of two subscribing witnesses.

WILLIAM H. KRUG.

Witnesses:
G. P. KRAMER,
HENRY J. GROSS.